Dec. 4, 1934.　　　D. A. CAMERON　　　1,983,165
CONTROL DEVICE
Filed Jan. 14, 1932

Inventor
Donald A. Cameron
By his Attorney

Patented Dec. 4, 1934

1,983,165

UNITED STATES PATENT OFFICE 1,983,165

CONTROL DEVICE

Donald A. Cameron, Detroit, Mich., assignor to Detroit Lubricator Company, Detroit, Mich., a corporation of Michigan Application January 14, 1932, Serial No. 586,517

11 Claims. (Cl. 251—20)

My invention relates to new and useful improvements in control devices, and more particularly to a device for controlling the flow of liquid, and which is adapted, among other uses, for embodiment in a liquid fuel supply line to a liquid fuel burner.

An object of my invention is to provide a control device in which the trapping of air or gases in the supply or delivery line between the device and the point of use of the liquid will be eliminated.

The invention consists in the novel construction and combination of parts, the novelty of which will be particularly pointed out and distinctly claimed.

In the accompanying drawing, to be taken as a part of this specification, I have fully and clearly illustrated a preferred embodiment of my invention, in which drawing—

Figure 1:
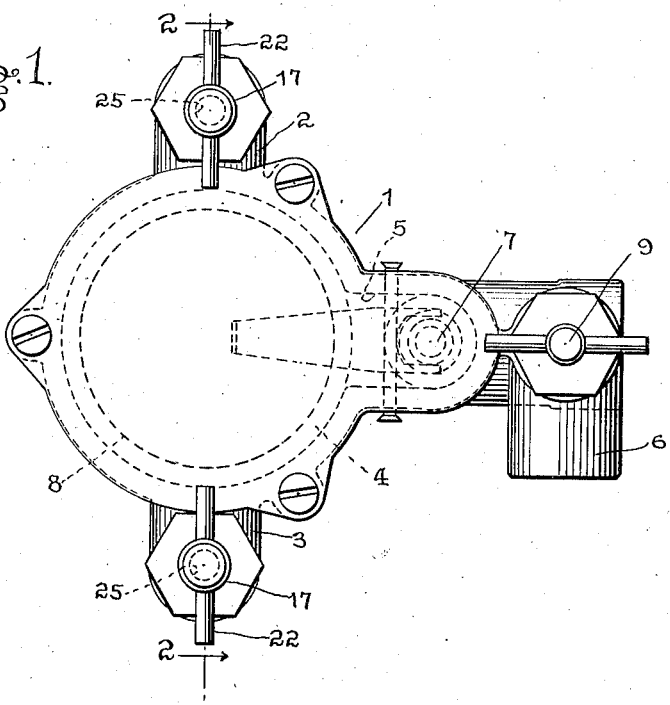
Figure 1 is a top plan view of a device embodying my invention.
Figure 2:
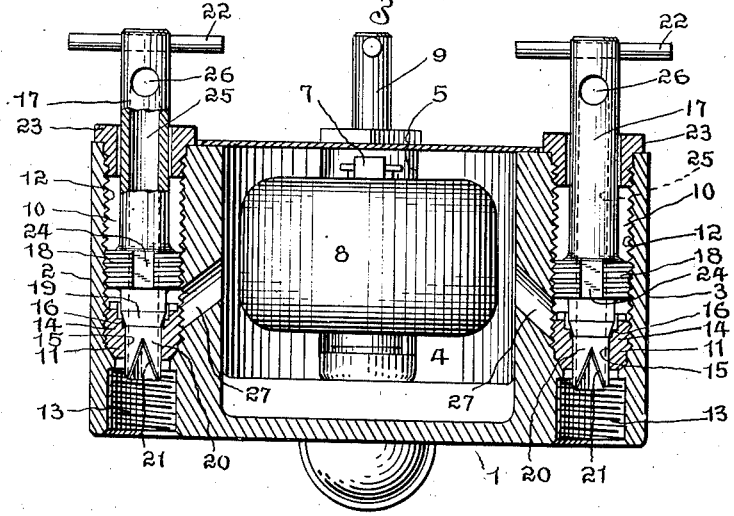
Fig. 2 is a view in vertical section on the line 2—2 of Fig. 1.

Referring to the drawing by characters of reference, 1 designates generally a hollow body or casing which is preferably substantially cylindrical, having lateral, oppositely positioned extensions or portions 2, 3 which extend from top to bottom of the casing. The interior of the casing defines a reservoir or constant level float chamber 4 which opens into a hollow vertical extension 5 intermediate the extensions 2, 3. The extension 5 contains the inlet valve mechanism controlling the inlet passage 6 to the chamber 4. The mechanism may be of the usual or conventional type, comprising a valve 7 which is opened and closed by a pivoted lever fixed to a float 8, so that downward movement of the float lifts or opens the valve, and vice versa. The inlet passage is also preferably controlled by a valve 9 which may be of the metering valve type.

Each of the extensions 2, 3 has a vertical, open-ended bore 10 therethrough defining a valve chamber and provided with an internal annular shoulder or seat 11. As the mechanisms in the extensions 2, 3 are identical, a description of one will suffice for both, and like reference characters will be applied to corresponding parts in each mechanism. The bore 10 is internally screw-threaded above and below the shoulder 11, as at 12, 13, respectively. A valve seat or sleeve member 14 is screwed, or otherwise secured in the bore 10 and is seated and sealed tightly against the shoulder 11, the sleeve member defining a partition in the chamber between the inlet and the outlet. Through the member 14 there is a vertical cylindrical bore or passage 15, which is concentric with the bore 10 and which is of slightly enlarged internal diameter at its upper end to provide a valve seat proper 16. Within the bore 10 there is a valve member having a stem 17 on which is a circumferential flange 18 having external screws threads in engagement with the threads 12 by which the stem is vertically reciprocable. Beneath the flange 18 the stem has a downward converging tapered or conical portion 19 defining the valve face for engagement with the seat 16. The stem terminates at its lower end in a cylindrical valve portion 20 having a sliding fit in the bore 15 and having a metering slot 21 therein cooperable with the wall of the bore 15. The slot 21 is of inverted V-shape, converging upwardly to a point and of such a height as to be closed or sealed by the wall of bore 15 when the valve is seated. The side walls of the slot 21 also preferably diverge slightly from each other toward the circumferential surface of portion 20, so that the depth of the slot decreases to zero at the apex thereof. The stem 17 extends upward above the extension 2 and is provided at the top of its external end with a cross-pin 22 to facilitate rotation of the stem to open and close or adjust the valve. The top end of bore 10 is closed by an externally threaded sleeve 23 threaded into the bore and through which the stem loosely passes for guided movement therein. In the flange 18 there is a vertical open-ended slot or passage 24 which serves as a vent for air or gases which may collect above the valve seat and beneath the flange 18. The stem 17 has a longitudinal axial bore 25 opening upwardly thereinto from its bottom end and terminating above the sleeve 23 at a lateral port 26 opening to atmosphere through the side of the stem. The chamber 4 is in communication with each of the bores 10 between the seat 11 and flange 18 by means of a port or passage 27.

The operation of my device is as follows, the device having been positioned in a liquid delivery line with inlet port 6 connected to a source of supply and with the outlets 13 having been connected by pipes, not shown, to separate liquid fuel burners, for example: The valve 9 is adjusted to regulate the rate of liquid flow to the float valve 7 which controls the admission of liquid to chamber 4 and maintains therein a constant liquid level, in a manner well known in the art. The liquid flows from the chamber 4 through the ports 27 to bores or passages 10 above the seat members 14. The flow to the outlets 13 is permitted by raising the valve faces 19 from the seats 16 and bringing the metering grooves or slots 21 into enlarged portions of bores 15. The rate of flow from ports 27 to outlets 13 will be dependent upon the extent to which the inverted V-groove 21 is raised above the bottom edge of the enlarged portion, as will be obvious. Should it happen that any air or gas might gather in the outlet pipe lines below the seat members 14, then any such air or gas will escape through the bores 25 and ports 26 to the atmosphere, instead of being carried along with the liquid to the burner, which air or gas would result in improper combustion of the liquid fuel and might cause failure of combustion, with the resultant danger from the overflow of unconsumed fuel. The slots 24 serve to permit escape of any air or gas which might collect above the members 14, the air or gas passing to the atmosphere through the passageways formed by the upper end portions of the bores 10 and by the space between the stems 17 and the sleeves 23.

It will thus be seen that I have provided means to relieve or vent the bores 10 and the feed line of gases which might collect therein, so that failure of combustion is overcome. It is also to be noted that the liquid level in the bores 10 is controlled by the float 8, so that the liquid does not rise high enough to overflow from sleeves 23 or from ports 26.

What I claim and desire to secure by Letters Patent of the United States is:

1. A valve for controlling the flow of liquid, comprising a casing having an inlet and an outlet, and a valve member adjustably screw-threaded in said casing and controlling flow from said inlet to said outlet, said valve member having a passageway open to atmosphere irrespective of the position of said valve member and operable to relieve said casing of gases which might collect therein.

2. A valve for controlling the flow of liquid, comprising a casing defining a valve chamber and having a sleeve member fixed therein, a valve member slidable in said sleeve member and having means cooperable with said sleeve member to meter flow therethrough, an inlet passage opening into said chamber at one side of said sleeve member, an outlet passage from said chamber at the other side of said sleeve member, and means comprising a passageway which is open to atmosphere irrespective of the position of said valve member and operable to relieve the chamber of gases which might collect therein.

3. A valve for controlling the flow of liquid, comprising a casing defining a valve chamber and having a sleeve member fixed therein, a valve member having a portion exposed to atmosphere and being slidable in said sleeve member and having means cooperable with said sleeve member to control flow therethrough, an inlet passage opening into said chamber at one side of said sleeve member, an outlet passage from said chamber at the other side of said sleeve member, and a passage through said valve member opening from the outlet side of said sleeve member to the outside of said casing to relieve the outlet passage of gases which might collect therein.

4. A device of the character described, comprising a casing having a chamber therein, an inlet to said chamber, a partition in said chamber below said inlet and having a port therethrough, a valve member reciprocably fitting in said port and having means cooperable with said partition to control flow therethrough, said valve member having means to vent said chamber above said partition, and a passage through said valve member from beneath said partition to atmosphere whereby to vent the chamber from beneath said partition.

5. A device of the character described, comprising a casing having a longitudinal bore therethrough, a sleeve member fixed in said bore and having a passage therethrough concentric with said bore, said passage being of enlarged internal diameter at its upper end to provide a valve seat, a valve member having a cylindrical externally threaded flange adjustably threaded in said bore, said valve member having a conical downward tapered face cooperable with said seat to close said passage and having a portion slidably fitting in said passage, said portion having a metering slot therein cooperable with the wall of said passage to regulate flow therethrough, said valve member having a stem projecting above said casing, a sleeve member surrounding said stem and closing the top of said bore, said flange having a transverse passage therethrough, said casing having an inlet passage to said bore between said flange and said valve seat, and said valve member and stem having a passage opening from the bottom end of said valve member through said stem to the atmosphere.

6. A device of the character described, comprising a casing having a bore open at its upper end and with an internally screw-threaded portion, an annular partition in said bore defining a valve port, a valve member in said bore cooperable with said port and having an externally screw-threaded portion threaded into said threaded portion whereby said valve member is adjustable, said bore being open to atmosphere irrespective of the position of said valve member, and said valve member having a slot extending transversely across said externally screw-threaded portion and establishing communication between said bore beneath said externally threaded portion and the open upper end of said bore whereby to vent said casing.

7. A device of the character described, comprising a casing having a bore therethrough open at its upper end to atmosphere and with an internally screw-threaded portion, an annular partition in said bore defining a valve port, a valve member in said bore cooperable with said port and having an externally screw-threaded portion threaded into said threaded portion whereby said valve member is adjustable, and said valve member having a longitudinally extending open-ended passage therethrough communicating with atmosphere whereby to vent said casing, said open-ended passage being open to atmosphere irrespective of the position of said valve member.

8. A device of the character described, comprising a casing having a bore therethrough with an internally screw-threaded portion, an annular partition in said bore defining a valve port, a valve member in said bore cooperable with said port and having an externally screw-threaded portion threaded into said threaded portion whereby said valve member is adjustable, said valve member having a longitudinally extending passage, open at one end through the end of said valve member beneath said partition and at its other end terminating in said valve member, and a port in the side wall of said valve member establishing communication between said other passage end and the atmosphere whereby to vent said casing.

9. A device of the character described, comprising a casing having a longitudinal bore open at its upper end, a partition in said bore having a passage therethrough concentric with said bore, a valve member having a portion reciprocable in said passage, said portion having a metering slot cooperable with a wall of said passage to regulate flow therethrough, said bore having an internally screw-threaded portion, an annular flange surrounding said valve member and having threads cooperable with said threaded portion, said casing having an inlet passage to said bore between said flange and said partition, said flange having a passage therethrough and establishing communication between said bore beneath said flange and the open upper end of said bore to vent said casing above said partition, and said valve member having a passage therethrough opening from beneath said partition to atmosphere to vent said casing beneath said partition.

10. A valve for controlling the flow of liquid, comprising a casing open to atmosphere and having an inlet and an outlet, and a valve member controlling flow through said casing and having a screw-threaded portion adjustably screw-threaded into said casing, said valve member having a slot extending across said portion transverse to the threads, said slot establishing communication from said casing beneath said threaded portion to atmosphere irrespective of the position of said valve member whereby to relieve said casing of gases which might collect beneath said portion.

11. A valve for controlling the flow of liquid, comprising a casing having a valve chamber open to atmosphere and with an inlet and an outlet, a sleeve member in said chamber intermediate said inlet and said outlet and defining a valve port, a valve member having metering means cooperable with said sleeve member to meter flow through said casing, said valve member having an externally screw-threaded portion adjustably screw-threaded in said casing, and said valve member having a passage extending transversely across said portion, said passage establishing communication from said chamber beneath said threaded portion to atmosphere irrespective of the position of said valve member whereby to relieve said chamber of gases which might collect therein.

DONALD A. CAMERON.